Figure 3:
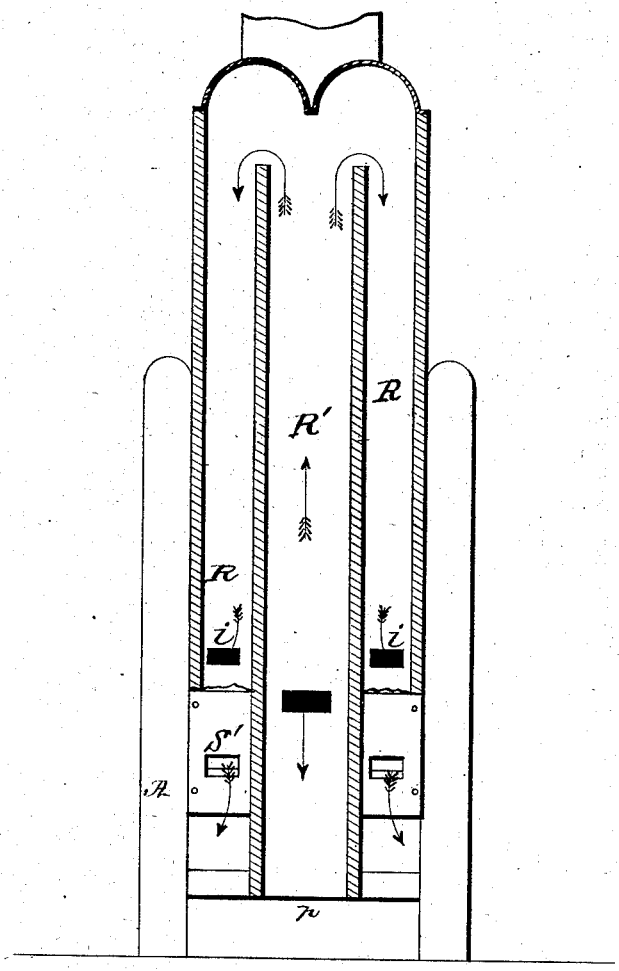

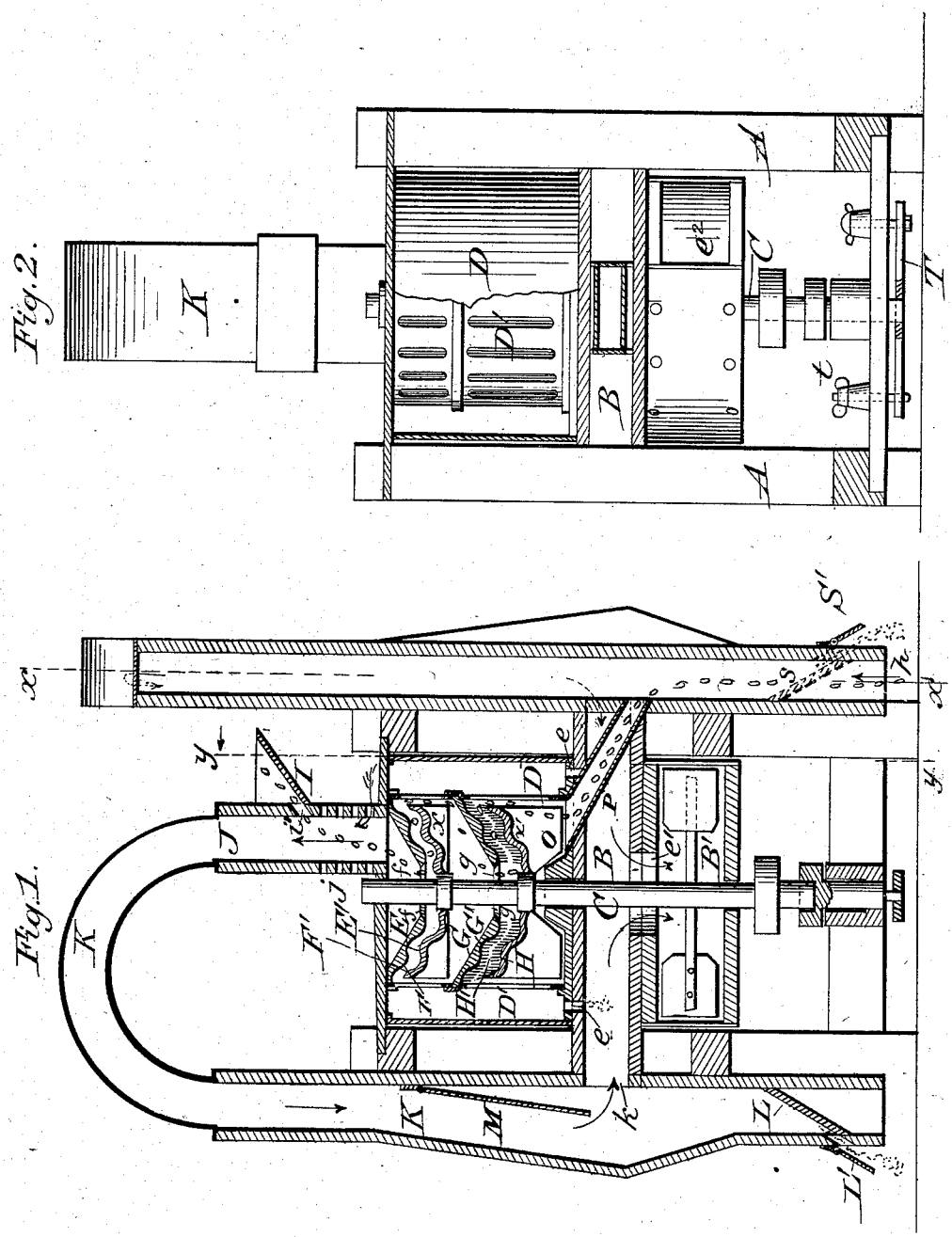

(No Model.) 2 Sheets—Sheet 2.

J. RUSSELL.
GRAIN CLEANER.

No. 255,029. Patented Mar. 14, 1882.

Attest:
F. H. Schott
H. Clay Smith

Inventor:
John Russell
By T. S. Smith
Atty

UNITED STATES PATENT OFFICE.

JOHN RUSSELL, OF BERLIN, PENNSYLVANIA.

GRAIN-CLEANER.

SPECIFICATION forming part of Letters Patent No. 255,029, dated March 14, 1882.

Application filed December 31, 1881. (No model.)

*To all whom it may concern:*

Be it known that I, JOHN RUSSELL, a citizen of the United States, residing at Berlin, in the county of Somerset and State of Pennsylvania, have invented certain new and useful Improvements in Grain-Cleaners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a grain scourer and cleaner; and the novelty consists in the construction and arrangement of parts, as will be more fully hereinafter set forth, and specifically pointed out in the claims.

The object of the invention is to subject the grain as it leaves the feeding-hopper to a counter-draft of air incited in the fan-box and vicinity by a proper fan, which draft will carry the dust, chaff, hulls, and the like away from the descending grain, and afterward to separate these cleanings into two divisions. The grain is then subjected to a rubbing or scouring process to separate the germ and projecting portions of the hull of the berry, after which it is brushed to eliminate dust, &c., and conducted to an exit-chute, where it encounters another air-blast, which separates the cleanings from the grain and divides it into two currents, which pass upward, over, and downward through diverging chutes, the draft taking up the dust and lighter or worthless portions, while the heavier portions — such as bran, germs, small pieces of the berries, &c.—are conducted to a proper receptacle, as will be explained.

The invention is fully illustrated in the accompanying drawings, which form a part of this specification, and in which Figure 1 is a central vertical section; Fig. 2, a transverse section through the line $y\ y$ of Fig. 1; and Fig. 3, a transverse section through the line $x\ x$, Fig. 1, taken upon a smaller scale.

To enable others skilled in the art to which the invention relates to make and use the same, I will describe the construction and mode of operation, reference being had to the said drawings, in which similar letters of reference indicate like parts in all the figures.

A represents a square or rectangular frame, in which are formed or located a fan-box, B, a fan-case, B', and journal-bearings for a vertical shaft, C.

Above the fan-box is located a close cylinder, D, within which is secured concentrically another cylinder, D', of smaller diameter, which latter is perforated with vertical slits, as seen in Fig. 2. A series of holes, $e$, connect the fan-box with the space between the cylinders D D'. An aperture, $e'$, connects the fan-box and fan-case, and the latter is provided with an outlet to the outer air at $e^2$.

The grain is fed into the hopper I and gravitates through an opening, $i'$, into a conductor, J, which is perforated upon all sides from the hopper down, to admit a draft of air, as shown at $j$, and leads into the interior of the cylinder D'. An air-draft incited by the vacuum created in the fan-box and vicinity encounters the flow of grain as soon as it enters the conductor J and separates the dust, chaff, &c., from the grain, which is allowed to gravitate through said conductor, while the cleanings are carried upward, over, and downward through the chute K, the dust and light or worthless portion being carried into the fan-box through the aperture $k$, thence through the apertures $e'$ and $e^2$, whence it goes to waste into the open air, the bran, hull, light portions of the berry, &c., gravitating until they strike an incline, L, and are directed through a valved opening, L', into a proper receptacle, for use as may be required. A deflector, M, prevents the valuable portions of these cleanings from entering the fan-box by deflecting them from the aperture $k$. The grain, after entering the cylinder D, falls upon a stationary concave, E, having corrugated or undulated lower surface, F, and between which and the shaft C sufficient space $f$ is left for the passage of the grain freely, the concave being secured to the cylinder D' at its periphery.

Secured to the shaft C and revolving therewith is a corresponding concave, E', having upper undulated surface, F', between which surfaces the grain is impelled outward by the centrifugal force imparted by the revolutions of the concave E' until it is rubbed and scoured, the germ and projecting hulls separated from the berry, and the grain deposited over the edge of the concave E′, and between it and the perforated cylinder D′, whence it gravitates to a concave, G, secured at its periphery to the cylinder, and having central aperture, $g$, the lower surface being provided with undulating brushes G′. The grain passes through the central aperture, $g$, of the stationary brush-concave G to a revolving brush, H, of corresponding undulating upper surface, H′; and a similar action of centrifugal power tends to brush the dust, &c., from the berries and deposit the grain between the periphery of the concave H and the cylinder D′, whence it gravitates into a hopper, O, and thence to the exit-chute, for the final air-draft. These sets of rubbers and brushes may be duplicated, if desired. As the grain gravitates from the concave E to the concave G the separated cleanings, &c., are subjected to a draft of air caused by the fan formed by the vertical leaves $x$, secured to the lower side of the concave E′, and a similar action accrues as the grain gravitates from the brushes to the hopper O by reason of the vertical leaves $x'$, the dust, &c., passing through the perforations in the cylinder D′, thence through the holes or apertures $e\ e'\ e^2$ to the open air, while the heavier or valuable portions gravitate with the grain to the conductor P, thence into the vertical chute R′, where it meets a counter-draft of air, which cleans the grain from all superfluities, the grain gravitating through the opening $p$, the germs, chaff, bran, &c., being carried upward, divided into two divergent streams, over and downward through the chutes R, the lighter dust passing into the fan-box and allowed to waste through the dust-ports $i$, while the heavier portions, germs, &c., are saved by means similar to L L′, as shown at S S′ in dotted lines, Fig. 1.

By means of a cross-bar, T, and thumb-screws $t$ the positions of the rubbers or brushes relatively to each other may be adjusted at will.

What I claim as new is—

1. The shaft C, carrying undulated concave rubber E′ F′, undulated brush H H′, and the fans $x\ x'$, combined with the perforated cylinder D′, having corresponding undulated rubber E F and undulated brush G G′, and with the cylinder D, having dust-ports $e$, as and for the purposes set forth.

2. The fan-box B, having dust-ports $k$ and $i$, the fan, and fan-case having dust-ports $e'\ e^2$, combined with the arched chute K, conductor J $j$, chutes R′ and R, deflector M, and exits, as set forth.

In testimony whereof I affix my signature in presence of two witnesses.

JOHN RUSSELL.

Witnesses:
H. CLAY SMITH,
WENTWORTH MANNING.